June 8, 1965 J. A. MEYER 3,188,093

TONE ARM RESTRAINING DEVICE

Filed Feb. 25, 1963

INVENTOR:
JERRY A. MEYER,

BY Norman C. Fulmer
HIS ATTORNEY.

United States Patent Office 3,188,093

Patented June 8, 1965

3,188,093
TONE ARM RESTRAINING DEVICE

Jerry A. Meyer, Decatur, Ill., assignor to General Electric Company, a corporation of New York Filed Feb. 25, 1963, Ser. No. 260,687
4 Claims. (Cl. 274—23)

This invention relates to devices for restraining the tone arm against movement when a record player is stored.

It is sometimes desirable to provide a record player cabinet which is of lesser depth than the depth (i.e. front to rear distance) of the record player. It is apparent that with such a cabinet the record player may not be totally stored in the cabinet by horizontal movement of the record player. One solution to the problem, occasioned by using a cabinet of lesser depth than the depth of the record player, is to arrange the record player to tilt to a vertical position and thereby provide a flush closure in the stored position. With such an arrangement, the enclosure depth need only be roughly equivalent to the height of the record player, which is normally much less than the depth of the record player.

However, pivotally mounting a record player in a cabinet presents at least one serious problem which pertains to protection of the record player tone arm. The tone arm of the usual record player is journaled to swing generally in the plane of the turntable for allowing an associated pickup device, normally provided with a needle, to track the record for reproducing the signals transcribed on a sensible medium. In addition, the usual practice is to allow pivotal movement of the tone arm upwardly from the record player to allow return movement of the tone arm as well as to enable inspection and cleaning of the pickup device. The tone arm is usually spring biased for upward movement of its free end, to allow a relatively low tracking force on the phonograph needle carried by the arm. Pivotal movement of the tone arm in conjunction with its spring biasing allows the tone arm to flop backwardly into the cabinet when the record player is tilted to a vertical position. When the record player is returned to its horizontal position, the center of gravity of the tone arm is behind its pivot point and the tone arm will consequently tend to remain in an upright position. The tone arm is then likely to strike portions of the enclosure thereby breaking the tone arm, damaging the needle, or otherwise destroying the effectiveness of the record player.

It is necessary, therefore, to provide some means for restraining the tone arm when the record player is tilted to the stored position. Automatic restraining devices such as electromagnetic latches, cams, levers, or springs controlled by movement of the turntable mechanism may be devised to function effectively, however, these solutions are prohibitorily expensive. Manually operated restraining devices, while economical to manufacture, require that the user remember to restrain the tone arm each time the record player is moved to the vertical position for storage. A moment's forgetfulness may not only result in damage to the tone arm or needle and a costly repair bill, but also, may result in dissatisfaction with the product.

Accordingly, it is an object of this invention to provide a record player tone arm restraining device which is economical to manufacture and automatically responsive to movement of the record player to a stored position.

Another object of this invention is to provide, for a record player arranged to be tilted to a vertical position for storage, a gravity-actuated tone arm restraining device.

It is yet another object of this invention to provide a tone arm restraining device, for a record player arranged to be tilted to a vertical position for storage, which has only a single moving member and which is responsive automatically to movement of the record player from a horizontal plane to provide a restraint upon free movement of the tone arm.

In a preferred embodiment of the invention, a support is fixed to the record player base and projects toward the tone arm, when the tone arm is in the rest position, supported by a rest post or limit stop. The support carries a pivot pin extending substantially parallel to the pivot axis of the record player in the cabinet, and a lever is journaled about the pin. The lever is not symmetrically disposed about the pivot pin, but rather the major portion of the lever extends between the pivot pin and the record player base to provide a gravity-bias whereby the lever pivots in response to vertical tilting of the record player. A latch or hook member is carried by the lever and extends adjacent the tone arm to engage a catch mounted on the tone arm when the lever pivots in response to tilting of the record player. The tone arm is thereby automatically restrained to the rest position when the record player is tilted, and the restraining device allows normal unrestricted movement of the tone arm when the record player is in a horizontal position.

Figure 1:
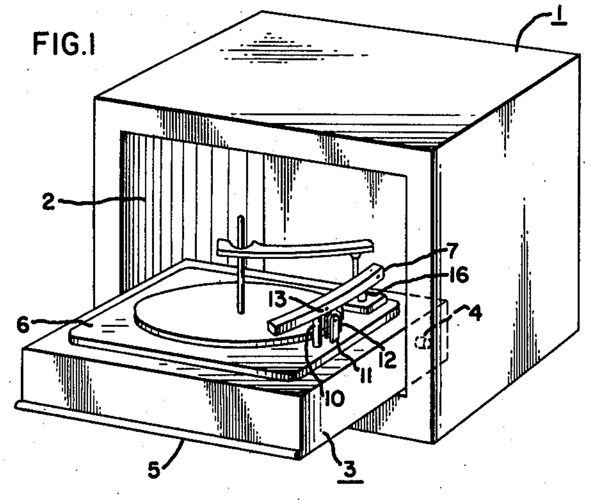
FIG. 1 shows a record player pivotally mounted within a cabinet.
Figure 2:
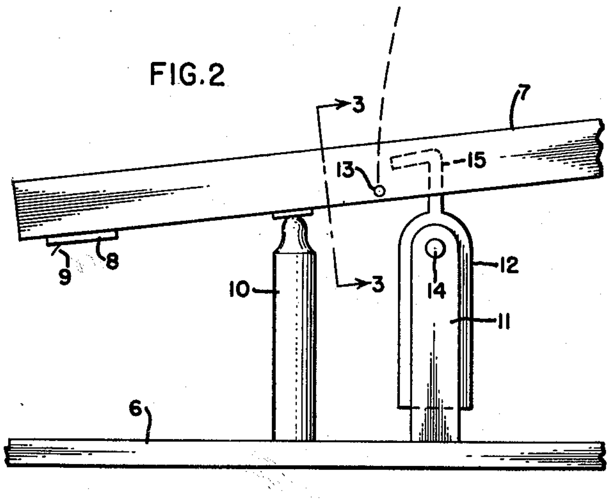
FIG. 2 is an enlarged view showing the retraining device when the record player is in the horizontal position.

In FIGS. 1 and 2 there is shown a record player cabinet 1 having a large frontal opening of 2 for accommodating a record player 3. The record player is attached to the cabinet by pivot pins 4 which allow the record player to be titled to a vertical position wherein bottom portion 5 of record player 3 provides a flush closure of opening 2 in cabinet 1.

Record player 3 includes a base 6 carrying a tone arm 7 mounted at a rear corner of base 6 such that it is horizontally pivotable for tracking records and also vertically pivotable to permit return of the tone arm as well as inspection and cleaning of reproducing device 8, mounted near the free end of tone arm 7 and carrying needle 9. A rest post or limit stop 10 is provided to limit motion of tone arm 7 toward base 6 when the tone arm is in a rest position.

In accordance with this invention, a support 11 is provided adjacent rest post 10 projecting upwardly toward tone arm 7. Support 11 is mounted on base 6 rearwardly of post 10 and carries a pivotally mounted lever 12 having a latch 15 for engagement with a catch 13, in the form of a pin or wire, mounted on the tone arm.

Referring more specifically to the enlarged view of FIG. 2, tone arm 7 is shown in its normal horizontal rest position wherein its movement toward base 6 is limited by engagement with rest post 10. Support 11 carries, preferably adjacent tone arm 7, a pivot pin 14 about which lever 12 is journaled. While support 11 is shown, in FIG. 3, to comprise a pin-supporting element on both sides of lever 12, it is apparent that only one supporting element is needed if pivot pin 14 is rigidly attached to such element.

Lever 12 is freely rotatable about pivot pin 14, and is normally caused by gravity to seek the predetermined position shown in FIG. 2, since the major portion of the lever is disposed between pivot 14 and base 6. Of course, many equivalent structures may be devised to provide similar movement. The present invention is intended to include other arrangements wherein a gravity-bias of lever 12 is achieved by unbalanced torques about pivot pin 14 as the lever is displaced from a vertical position relative to the earth's surface. Also, it is apparent that the gravity-bias force will be maximized when the pivot axis of lever 12, as defined by pin 14, is parallel to the axis about which the record player is tilted. However, it is only necessary that these axes be substantially parallel and the wide deviation is permissible by making small the bearing friction between lever 12 and pin 14.

Figure 3:
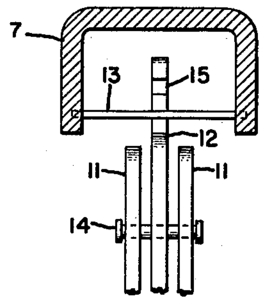
FIG. 3 is a sectional view taken along line 3—3 of FIG. 2.

In order to provide a restraint of tone arm 7 in response to pivotal movement of lever 12, lever 12 carries an L-shaped latch 15 which may be fastened to the lever by any suitable means, or preferably be formed integrally therewith. A portion of latch 15 extends within a complementary recess in tone arm 7, as illustrated in FIG. 3. Generally this requires no special configuration of tone arm 7, since tone arms are commonly U-shaped in cross section with the opening thereof facing downwardly.

In the horizontal position of the record player shown, tone arm 7 is free to move upwardly. This is because latch 15 is disposed above and slightly rearwardly of catch 13. Catch pin 13 moves generally along the path of the dashed line past the tip of latch 15 as the tone arm pivots upwardly. However, the tip of latch 15 is closely adjacent the path traversed by catch pin 13.

Figure 4:
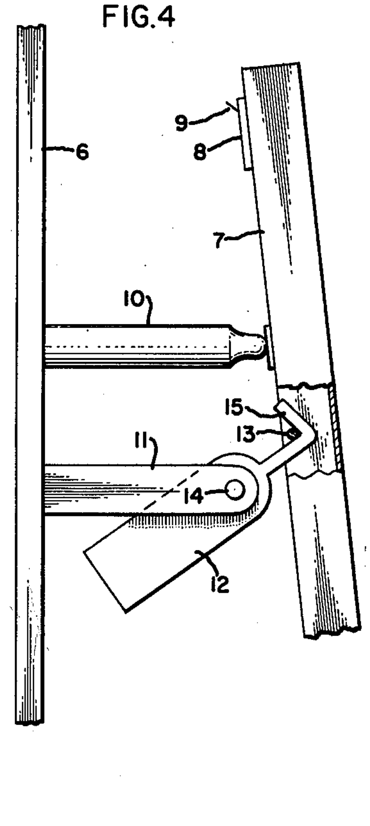
FIG. 4 shows the restraining device when the record player is tilted to the vertical position.

The force of gravity will initially keep lever 12 in a fixed position relative to the earth as the record player 3 is pivoted from its horizontal to its vertical position. As the record player is initially pivoted upwardly from its horizontal position, the tone arm 7 moves with it, since it is resting on rest post 10.. When the record player 3 reaches a predetermined angular disposition relative to the horizontal, catch pin 13 thereupon moves into cooperative engagement with latch 15. Tone arm 7 is then restrained from disengaging rest post 10 (as shown in FIG. 4). The record player 3 reaches the predetermined angular relationship to the horizontal for engagement of latch 15 with catch pin 13, before the angular relationship between the record player 3 and the horizontal becomes sufficiently great to allow the free end of the tone arm of lift off the rest post 10. It will thus be understood that the latch 15 effectively cooperates with catch pin 13 to automatically restrain the tone arm in its rest position whenever the record player 3 is tilted toward its vertical position.

While in the preferred embodiment of the subject invention as shown and described, latch 15 takes the form of an L-shaped member, and catch 13 in the form of a pin or wire secured to the sides of tone arm 7, it will be apparent that many modifications and variations of this latching and catching arrangement may be devised. For example, the lever 12 may carry a pin which engages an L-shaped bracket or hook member mounted either inside tone arm 7 or external thereto. It is only required that there be some portion of lever 12 which swings into restraining engagement with a corresponding member on tone arm 7, when the lever 12 pivots about pivot pin 14 of support 11, under the force of gravity, as the record player is tilted. The lever 12 may, if desired, be mounted on, or carried by a member mounted on, the tone arm pivot post 16, and will function as decribed above. If this post 16 turns with horizontal movement of the tone arm, or if the lever 12 is carried by a platform often pivotally mounted on a post 16, to which the tone arm is pivoted for vertical movement, then lever 12 will always be vertically aligned with the tone arm 7 and will function over a wide range of horizontal positions of the tone arm when the record player is tilted to closed position. In the foregoing embodiments the lever 12 has a substantially fixed vertical orientation or spacing with respect to the base 6.

Other modifications of the invention will occur to those skilled in the art, and will be within the scope of invention as defined by the following claims.

What is claimed as new and desired to be secured by Letters Patent of the United States is:

1. A record player arranged to be tilted about a horizontal axis to a vertical storage position, said record player having a base supporting a tone arm mounted to pivot about an axis parallel to said base and having a limit stop for said tone arm in its rest position, a catch on said tone arm, a lever mounted in fixed vertical orientation with respect to said base for pivoting movement about an axis substantially parallel to said horizontal axis and including a latch adapted to engage said catch, said lever being gravity-biased to move said latch into engagement with said catch when said record player is moved toward its storage position whereby said tone arm is maintained in its rest position during storage.

2. A record player arranged to be tilted above a horizontal axis to a vertical storage position, said record player having a base supporting a tone arm mounted to pivot about an axis parallel to said base and having a limit stop for said tone arm in its rest position, a support fixed to said base and projecting toward the tone arm when said tone arm is in the rest position, a pivot pin carried by said support adjacent the tone arm and extending substantially parallel to said horizontal axis, a lever journaled about said pivot pin and having the major portion thereof extending between said pivot pin and said base whereby gravity forces cause pivotal movement of said lever when the record player is moved toward the storage position, a latch fixed to move with said lever and extending in juxtaposition to said tone arm, and a catch on said tone arm engaged by said latch when said lever pivots in response to movement of said record player to the storage position, whereby said tone arm is maintained in its rest position during storage.

3. A record player arranged to be tilted about a horizontal axis to a vertical storage position, said record player having a base supporting a tone arm mounted to pivot about an axis parallel to said base and having a limit stop for said tone arm in its rest position, a support fixed to said base and projecting upwardly toward said tone arm when the tone arm is in its rest position, a lever journaled about said support and gravity-biased toward a predetermined position whereby said lever pivots when said record player is moved toward the storage position, an L-shaped latch carried by said lever and extending in juxtaposition to said tone arm, and a pin on said tone arm engaged by said latch when said lever pivots in response to movement of said record player to the storage position, whereby said tone arm is maintained in its rest position during storage.

4. A record player arranged to be tilted about a horizontal axis to a vertical storage position, said record player having a base supporting a tone arm mounted to pivot about an axis parallel to said base and having a limit stop for said tone arm in its rest position, said tone arm having a portion of U-shaped cross section intermediate the ends of said tone arm with the opening of said portion facing downwardly toward said base, a support fixed to said base and projecting upwardly toward said tone arm when the tone arm is in its rest position, a lever journaled about said support and gravity-biased toward a predetermined position whereby said lever pivots when said record player is moved toward the storage position, an L-shaped latch carried by said lever and projecting upwardly between the opposite sides of said portion of U-shaped cross section, and a pin fixed to said opposite sides of said portion and extending across the opening thereof for engagement by said latch when said lever pivots in response to movement of said record player to the storage position, whereby said tone arm is maintained in its rest position during storage.

References Cited by the Examiner

UNITED STATES PATENTS

| | | | |
|---|---|---|---|
| 1,584,184 | 5/26 | Mitchell | 274—16 |
| 1,799,728 | 4/31 | Byrd | 292—131 X |
| 1,915,906 | 6/33 | Thomas | 179—100.4 |
| 2,246,130 | 6/41 | Forstrom | 271—1 |
| 2,268,180 | 12/41 | Blethen | 274—9 |
| 2,554,950 | 5/51 | Maris | 274—1 X |
| 2,926,921 | 3/60 | Knecht | 274—23.2 |
| 2,955,825 | 10/60 | Starr | 274—1 |
| 2,998,255 | 8/61 | Pfundt | 274—1 |

FOREIGN PATENTS

| | | |
|---|---|---|
| 539,883 | 2/56 | Italy. |

NORTON ANSHER, *Primary Examiner.*